United States Patent
Chen et al.

(10) Patent No.: US 8,139,155 B2
(45) Date of Patent: Mar. 20, 2012

(54) SELF-ADAPTIVE IMAGE PROCESSING DEVICE AND METHOD

(75) Inventors: Mei-Fei Chen, Hsinchu (TW); Chuan-Lung Huang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 1212 days.

(21) Appl. No.: 11/553,471

(22) Filed: Oct. 27, 2006

(65) Prior Publication Data

US 2008/0024670 A1    Jan. 31, 2008

(30) Foreign Application Priority Data

Jul. 25, 2006 (TW) .............................. 95127071 A

(51) Int. Cl.
   *H04N 5/21* (2006.01)
   *H04N 5/20* (2006.01)
(52) U.S. Cl. .................. 348/630; 348/708; 348/620
(58) Field of Classification Search .......... 348/625–631, 348/638–648, 618–621, 708, 710–713
See application file for complete search history.

(56) References Cited

U.S. PATENT DOCUMENTS

| 5,208,662 A * | 5/1993 | Song ........................ 348/702 |
| 7,327,405 B1 * | 2/2008 | Lowe et al. ................ 348/663 |
| 2006/0176405 A1 | 8/2006 | Chen |

OTHER PUBLICATIONS

"1st Office Action of Chinese counterpart application", issued on Mar. 6, 2009, p. 1-p. 6.

* cited by examiner

*Primary Examiner* — Michael Lee
(74) *Attorney, Agent, or Firm* — Jianq Chyun IP Office

(57) ABSTRACT

A dynamic motion degree of a video composite signal is estimated. A chrominance signal after Y/C separation and chrominance demodulation is narrow-band low pass filtered (NBLPF) and wide-band low pass filtered (WBLPF), so as to generate a narrow-band filtered signal and a wide-band filtered signal. The narrow-band filtered signal and the wide-band filtered signal are weighted based on the estimated dynamic motion degree, so as to determine how much high frequency component of the chrominance signal is reserved. In the static image processing, more high frequency component is reserved, so as to reduce the color transition issue and keep the image color being sharp. In the dynamic image processing, more high frequency component is filtered, so as to reduce the cross color issue.

14 Claims, 3 Drawing Sheets

SELF-ADAPTIVE IMAGE PROCESSING DEVICE AND METHOD

CROSS-REFERENCE TO RELATED APPLICATION

This application claims the priority benefit of Taiwan application serial no. 95127071, filed on Jul. 25, 2006. All disclosure of the Taiwan application is incorporated herein by reference.

BACKGROUND OF THE INVENTION

1. Field of the Invention

The present invention relates to a self-adaptive image processing device and a processing method capable of determining how much high frequency component of the image is reserved according to the motion degree of the image.

2. Description of Related Art

Watching TV has become one of the entertainments for modern people. Generally speaking, the type of a video composite signal received by the TV set varies depending upon the difference of the definition of the color space. For example, in the YUV color space, the video composite signal includes a luminance component (Y), and a color information component (U and V), and the video composite signal is expressed as: Y+U sin($\omega$t)+V cos($\omega$t). In the YCbCr color space, the video composite signal includes a luminance component (Y), and a chrominance component (Cb and Cr), and the video composite signal is expressed as: Y+Cb sin($\omega$t)+Cr cos($\omega$t). In the YIQ (I; in-phase, Q: quadrature) color space, the video composite signal includes a luminance component (Y), and a color component (I and Q), and the video composite signal is expressed as: Y+Q sin($\omega$t+33°)+I cos($\omega$t+33°). Generally speaking, Y video component is a luminance signal, and the U, V, Cb, Cr, I, Q and the like, which are not the luminance signal, are all called the chrominance signal.

When the TV set receives the video composite signal, it is required to separate the luminance component Y from the color information component U/V (or chrominance component Cb/Cr, color component I/Q) and demodulate the color information component U/V. However, the color information component U/V (or chrominance component Cb/Cr, color component I/Q) after demodulation includes a baseband component and a high frequency component.

For example, in the YUV color space, the baseband component and the high frequency component of the color information component U/V after demodulation are expressed as follows:

$$((U\sin(wt)+V\cos(wt))*(2\sin(wt))=U-U\cos(2wt)+V\sin(2wt) \quad (1);$$

$$((U\sin(wt)+V\cos(wt))*(2\cos(wt))=V+V\cos(2wt)+U\sin(2wt) \quad (2).$$

In Equation (1), U represents the baseband component of the U component, and (−U cos(2wt)+V sin(2wt)) represents the high frequency component of the U component. Similarly, in Equation (2), V represents the baseband component of the V component, and V cos(2wt)+U sin(2wt) represents the high frequency component of the V component.

Currently, the low pass filter is used to remove the high frequency component. If a narrow-band low pass filer, suitable for processing dynamic images, is used in the static image processing, the color transition problem occurs, and the color is not sharp enough, because most of the high frequency component of the color is filtered. On the other aspect, if a wide-band low pass filter, suitable for processing static images, is used in the dynamic image process, the cross color problem occurs.

Therefore, a self-adaptive device and method for dynamically adjusting the color bandwidth is required, thus, in the static image processing, the color transition issue is reduced and the color is kept sharp; in the dynamic image processing, the cross color issue is reduced.

SUMMARY OF THE INVENTION

In order to resolve the above problems, the present invention provides a self-adaptive image processing device and a method, so as to process static images and dynamic images appropriately. In the static image processing, more high frequency component of the image is reserved. In the dynamic images processing, more high frequency component of the image is filtered.

Moreover, the present invention provides a self-adaptive image processing device and a method, wherein in the static image processing, the color transition issue is reduced, and the color of the image is kept sharp; in the dynamic image processing, the cross color issue is reduced.

In order to achieve the objective of the present invention, the present invention provides an image processing device, which comprises a dynamic estimating unit, for estimating a dynamic motion degree of a video composite signal so as to output a motion factor; a first low pass filter and a second low pass filter, for receiving a chrominance signal and performing a low pass filtering to generate a first filtered signal and a second filtered signal, wherein the chrominance signal represents a chrominance component of the video composite signal after a luminance/chrominance separation and a demodulation; and a weighting unit, for weighting the first filtered signal and the second filtered signal according to the motion factor, so as to determine how much high frequency component of the chrominance signal is reserved.

Moreover, the present invention also provides an image processing method, suitable for filtering a chrominance component of a video composite signal, the chrominance component being obtained after a luminance/chrominance separation and a demodulation of the video composite signal. The method comprises the following steps. A dynamic feature of the video composite signal is estimated; a first filtering and a second filtering are performed to the chrominance component of the video composite signal; and the results of the first and second filtering processes are weighted according to the dynamic feature, so as to determine how much high frequency component of the chrominance component of the video composite signal is filtered.

In order to make aforementioned and other objects, features and advantages of the present invention comprehensible, preferred embodiments accompanied with figures are described in detail below.

DESCRIPTION OF EMBODIMENTS

In order to appropriately process static images and dynamic images, a self-adaptive image processing device is disclosed in an embodiment of the present invention, which at least includes two low pass filters with different bandwidths. In the static image processing, the signal processed by the wide-band low pass filter is assigned by a relative large weighting value. On the other aspect, in the dynamic image processing, the signal processed by the narrow-band low pass filter is assigned by a relative large weighting value. In this manner, in the static image processing, the color transition issue is reduced, and the color is kept sharp; in the dynamic image processing, the cross color issue is reduced.

Figure 1:
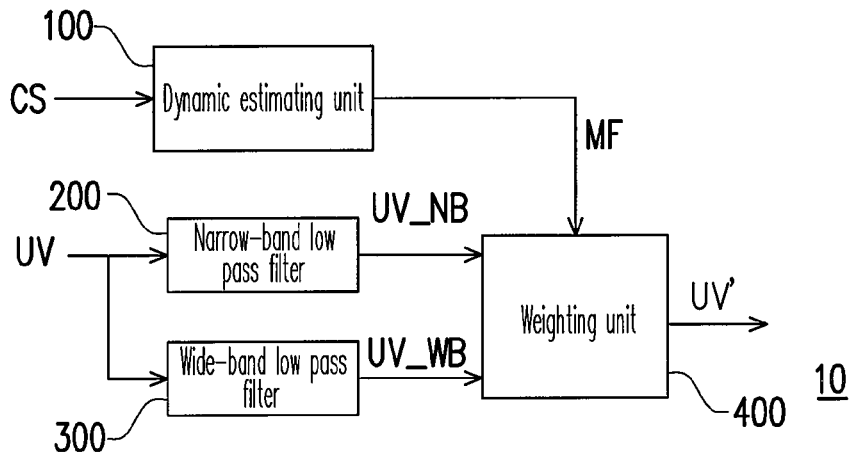
FIG. 1 is a circuit block diagram of a self-adaptive image processing device according to a preferred embodiment of the present invention.

FIG. 1 is a circuit block diagram of a self-adaptive image processing device 10 according to a preferred embodiment of the present invention. It should be noted that, FIG. 1 shows the circumstance that is used in the YUV color space. In FIG. 1, an input signal CS represents the video composite signal, and a color information signal UV represents the color information signal with a high frequency component and a baseband component. Herein, the video composite signal CS includes a luminance component and a chrominance component. For example, when it is applied to the YUV color space, Y component represents the luminance component, and U component and V component represent the chrominance component. That is to say, the color information signal UV is considered as the chrominance component of the video composite signal CS. Particularly, the color information signal UV is the chrominance component obtained after the luminance component/chrominance component separating processing and the demodulation processing of the video composite signal CS.

As shown in FIG. 1, the image processing device 10 includes a dynamic estimating unit 100, a narrow-band low pass filter 200, a wide-band low pass filter 300 and a weighting unit 400.

The dynamic estimating unit 100 receives the video composite signal CS, estimates the dynamic motion degree of the video composite signal CS, and outputs a motion factor MF. The motion factor MF is used to represent the dynamic motion degree of the video composite signal CS. For example, the value of the motion factor MF is large if the dynamic motion degree of the video composite signal CS becomes great, that is, the video composite signal CS may be considered as a dynamic image. On the contrary, the value of the motion factor MF is small if the dynamic motion degree of the video composite signal CS becomes small, that is, the video composite signal CS is considered as a static image.

The narrow-band low pass filter 200 receives the color information signal UV, and performs the narrow-band low pass filtering to the color information signal UV, so as to obtain a narrow-band filtered signal UV_NB.

The wide-band low pass filter 300 receives the color information signal UV, and performs the wide-band low pass filtering to the color information signal UV, so as to obtain a wide-band filtered signal UV_WB.

The weighting unit 400 receives the motion factor MF output by the dynamic estimating unit 100, the narrow-band filtered signal UV_NB output by the narrow-band low pass filter 200 and the wide-band filtered signal UV_WB output by the wide-band low pass filter 300. The weighting unit 400 determines the weight for the narrow-band filtered signal UV_NB and the weight for the wide-band filtered signal UV_WB according to the motion factor MF, so as to output a color information signal UV'.

Basically, the color information signal UV' is considered as the baseband component with a part of the high frequency component of the color information signal UV. Alternatively, the color information signal UV' is considered as the signal remained after a part of the high frequency component is removed from the color information signal UV. As for how much of the high frequency component of the color information signal UV is filtered, it depends upon the dynamic motion degree of the video composite signal CS. For example, the greater the dynamic motion degree of the video composite signal CS is, the more high frequency component is filter; and on the contrary, the smaller dynamic motion degree of the video composite signal CS is, the less high frequency component is filtered.

Figure 2:
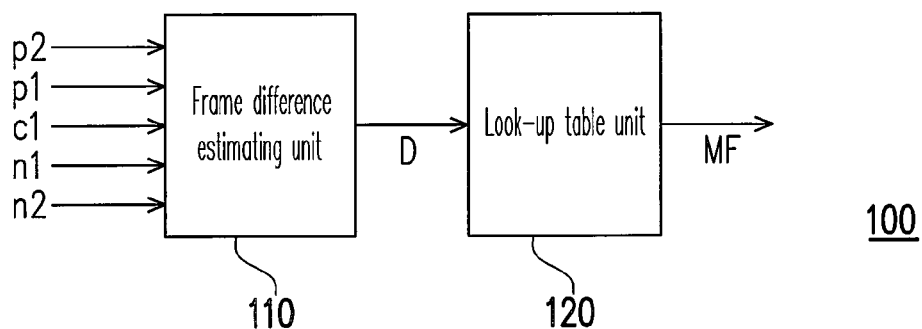
FIG. 2 is a circuit block diagram of a dynamic estimating unit of FIG. 1.

FIG. 2 is a circuit block diagram of a dynamic estimating unit 100 of FIG. 1. The dynamic estimating unit 100 includes a frame difference estimating unit 110 and a look-up table unit 120. The representation meanings of the reference numerals p2, p1, c1, n1 and n2 of FIG. 2 may be obtained with reference to FIG. 3. The frame difference estimating unit 110 outputs a frame difference value D according to p2, p1, c1, n1 and n2, and the frame difference value D is input to the look-up table unit 120, so as to correspondingly obtain the motion factor MF.

Figure 3:
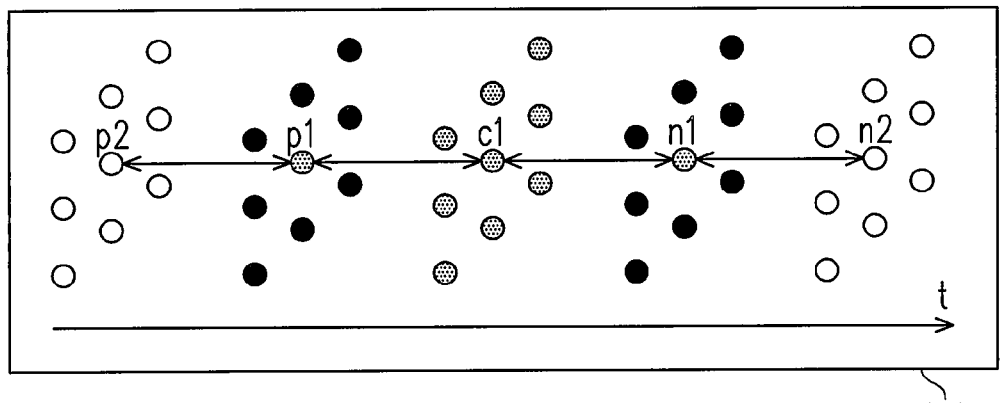
FIG. 3 is a circuit block diagram of a frame difference estimating unit of FIG. 2.

Referring to FIG. 3, five frames shown in FIG. 3 respectively represent five successive frames displayed in sequence, that is, the displaying sequence is that, the frame before the previous frame→the previous frame→the current frame→the next frame→the frame after the next frame. Therefore, it is known from FIG. 3 that, the reference numerals p2, p1, c1, n1 and n2 represent the video composite signal CS at the same display position (i.e., the same pixel) of the five frames.

When the National Television Standards Committee (NTSC) specification is applied in the present embodiment, the frame difference value D are defined as follows:

$$D1=abs(p1-c1) \tag{3}$$

$$D2=abs(c1-n1) \tag{4}$$

$$D=abs(D1-D2) \tag{5}$$

Equation (3) represents that, the absolute differential value of p1 and c1 is defined as D1. Similarly, Equation (4) represents that the absolute differential value of c1 and n1 is defined as D2. When the image is static, the value of D1 is quite close to that of D2. On the contrary, when the image is dynamic, the value of D1 is significantly different from that of D2. Equation (5) represents that the frame difference value D is defined as the absolute value of the difference value between D1 and D2.

When the Phase Alternating Line (PAL) specification is applied in the present embodiment, the frame difference values D are defined as follows:

$$D1=abs(p2-c1) \tag{6}$$

$$D2=abs(c1-n2) \tag{7}$$

$$D=abs(D1-D2) \tag{8}$$

The representations of Equations (6)-(8) are similar to that of Equations (3)-(5), which thus will not be repeated herein.

It is known by those skilled in the art that, the definition of the frame difference value D is not limited to the above equations. Those skilled in the art may appreciate different definition manners in the field, and the implementation of the present embodiment is not limited herein.

Figure 4:
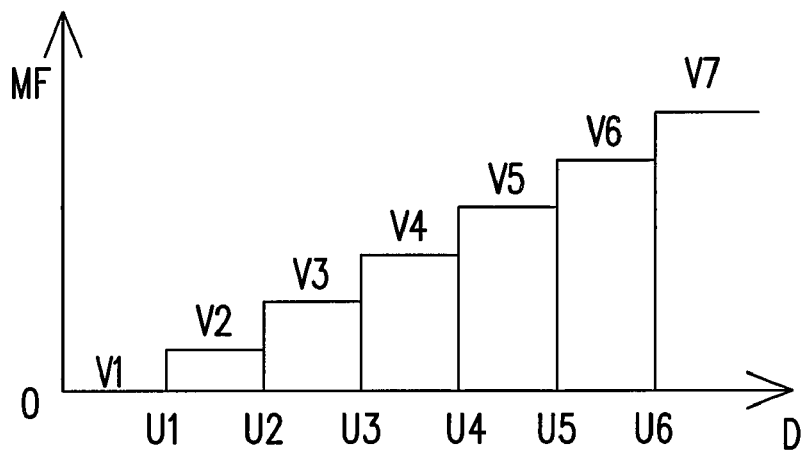
FIG. 4 shows a look-up table of FIG. 1 and FIG. 2.

After the frame difference value D has been determined, the look-up table unit 120 obtains the corresponding motion factor MF according to an internal relationship curve. The curve of the relationship between the frame difference value D and the motion factor MF is as shown in FIG. 4 for example. For convenience, the motion factor MF may be normalized to be between 0 and 1. When the D value is smaller than U1, MF value is V1 (the value may be 0); when the D value is between U1 and U2, MF value is V2, and so forth. V7 is the maximum value of MF, which may be 1.

Next, how the narrow-band low pass filter 200 and the wide-band low pass filter 300 perform the low pass filtering to the color information signal UV is described below.

Figure 5A:
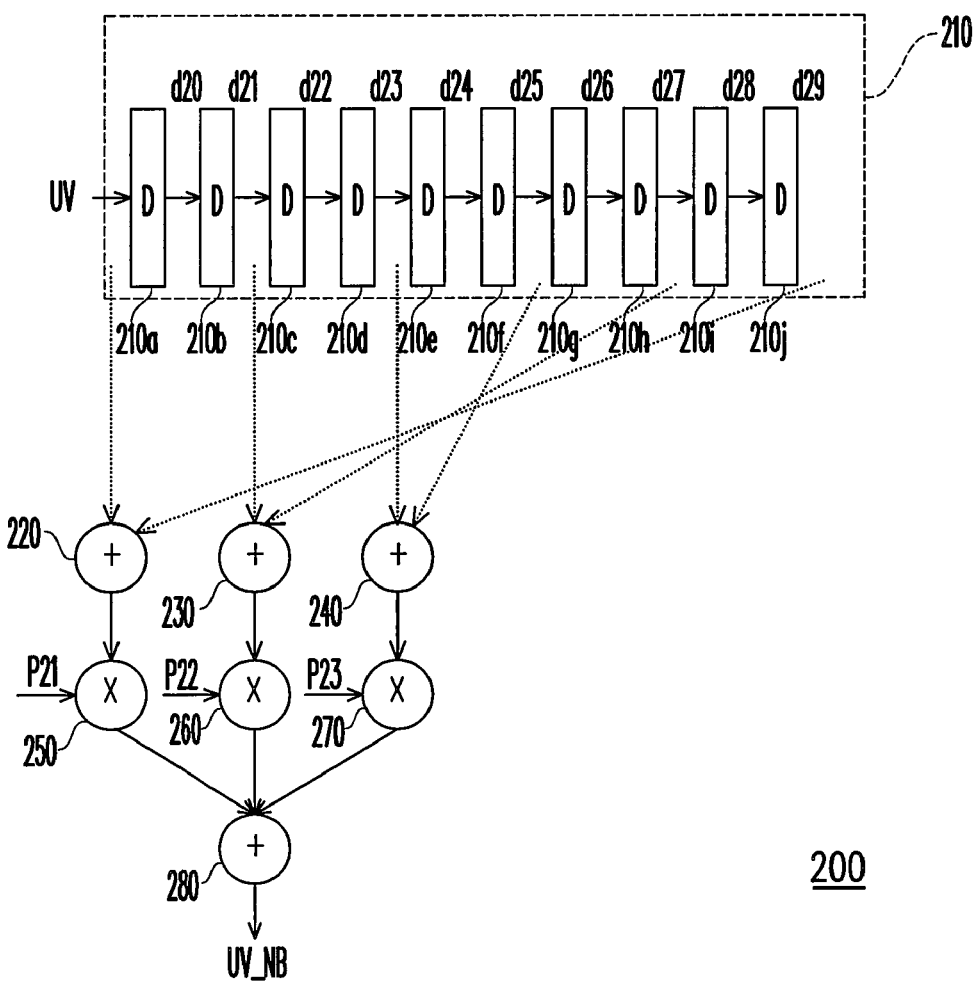
FIG. 5a is a schematic view of a narrow-band low pass filter.
Figure 5B:
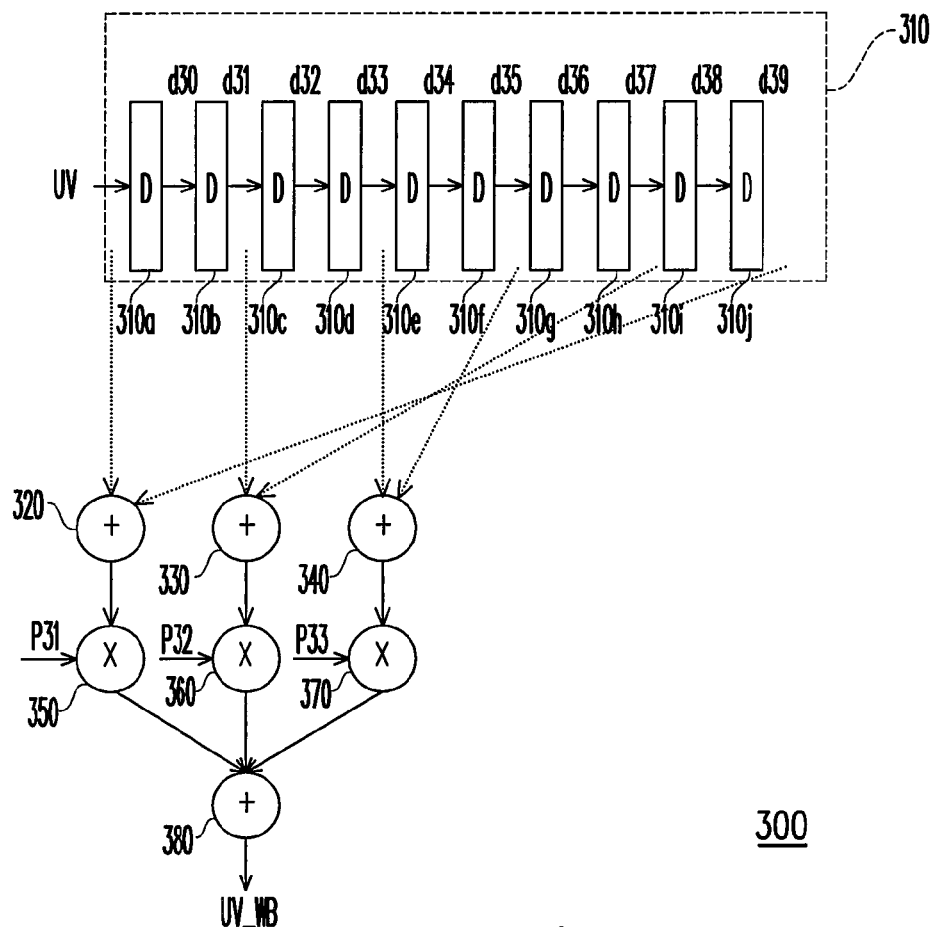
FIG. 5b is a schematic view of a wide-band low pass filter.

FIG. 5a is a schematic view of the narrow-band low pass filter 200. FIG. 5b is a schematic view of the wide-band low pass filter 300. In the present embodiment, the structure and operations of the narrow-band low pass filter 200 are quite similar to that of the wide-band low pass filter 300. However, the structures and operations of the narrow-band low pass filter 200 may be respectively different from that of the wide-band low pass filter 300, so long that the narrow-band low pass filtering and the wide-band low pass filtering may be performed to the color information signal UV respectively.

As shown in FIG. 5a, the narrow-band low pass filter 200 includes a re-sampler 210, adders 220-240, multipliers 250-270 and an adder 280.

The re-sampler 210 includes a plurality of (e.g., 10) serially-connected registers 210a-210j. Each of the registers 210a-210j registers the color information signal UV and then outputs it as d20-d29.

The adder 220 sums up the color information signal UV and the register output d29, and outputs the summing result to the multiplier 250. The adder 230 sums up the register output d21 and the register output d27, and outputs the summing result to the multiplier 260. The adder 240 sums up the register output d23 and the register output d25, and outputs the summing result to the multiplier 270.

The reason of selectively taking every other of the register outputs d20-d29 lies in taking out the same sub components of the color information signal UV. Particularly, when 6 register outputs that are taken out at a certain time are all V components, the subsequent processing are conducted, and then, the weighting unit 400 outputs the processed V components. Then, at the next time point, the 6 register outputs are all U components, and the subsequent processing is conducted, and then, the weighting unit 400 outputs the processed U components. Moreover, if it is necessary, the sampling quantity may be changed.

The multiplier 250 multiplies the summing result of the adder 220 by the parameter p21, and outputs the multiplying result to the adder 280. The multiplier 260 multiplies the summing result of the adder 230 by the parameter p22, and outputs the multiplying result to the adder 280. The multiplier 270 multiplies the summing result of the adder 240 by the parameter p23, and outputs the multiplying result to the adder 280. The adder 280 sums Up the multiplying results of the multipliers 250-270 to obtain the narrow-band filtered signal UV_NB. The parameters p21-p23 may be varied depending upon the designed bandwidth.

As shown in FIG. 5b, the wide-band low pass filter 300 includes a re-sampler 310, adders 320-340, multipliers 350-370 and an adder 380. The re-sampler 310 includes a plurality of (e.g., 10) serially-connected registers 310a-310j. The parameters p31-p33 may be varied depending upon the designed bandwidth.

Since the structure and operations of the narrow-band low pass filter 200 may be quite similar to that of the wide-band low pass filter 300, based upon the above description, those skilled in the art may appreciate that how the wide-band low pass filter 300 performs the wide-band filtering to the color information signal UV, so as to obtain the wide-band filtered signal UV_WB.

Figure 6:
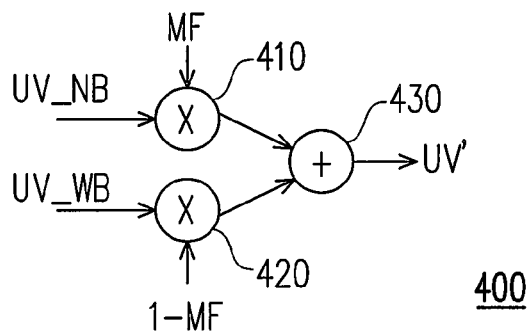
FIG. 6 is a schematic view of a weighting unit of FIG. 1.

FIG. 6 is a schematic view of a weighting unit 400 of FIG. 1. As shown in FIG. 6, the weighting unit 400 includes multipliers 410, 420 and an adder 430.

The multiplier 410 multiplies the narrow-band filtered signal UV_NB by the motion factor MF, and outputs the multiplying result to the adder 430. The multiplier 420 multiplies the wide-band filtered signal UV_WB by the parameter (1-MF), and outputs the multiplying result to the adder 430. The adder 430 sums up the multiplying results of the multipliers 410 and 420, so as to obtain the color information signal UV'.

It is known from the architecture of FIG. 6 that, in the present embodiment, the greater the dynamic motion degree of the image is (that is, the motion factor MF is larger), the higher proportion the narrow-band filtered signal UV_NB takes in the color information signal UV'. On the contrary, the smaller the dynamic motion degree of the image is (that is, the motion factor MF is smaller), the higher proportion the wide-band filtered signal UV_WB takes in the color information signal UV'.

Although the weighting unit 400 utilizes the linear weighting to obtain the color information signal UV' in this embodiment, those skilled in the art would understand that other weighting schemes also can be applied in the present embodiment.

Although the YUV color space is taken as an example for illustration in the present embodiment, other color spaces also can be applied in the present embodiment, as long as they have both the luminance component and the chrominance component. For example, when it is applied in the YCbCr color space, Y component still represents the luminance component, and the chrominance signal CbCr represents the chrominance component. Alternatively, when it is applied in the YIQ color space, Y component still represents the luminance component, and I component and Q component represent the chrominance component. The chrominance component serves as an input signal for the low pass filter 200/300.

Although in the above embodiments, the image processing device only includes two low pass filters with different bandwidths, those skilled in the art may modify it to a plurality of low pass filters with different bandwidths, so as to achieve the purpose of the present embodiment.

To sum up, in the present embodiment, during the static image processing, not only the color transition issue is reduced, but also the color is kept sharp; and during the dynamic image processing, the cross color issue is also reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. An image processing device, comprising:
a dynamic estimating unit, for estimating a dynamic motion degree of a video composite signal, so as to output a motion factor, wherein the motion factor has a respective value for each pixel at the same location of a plurality of successive frames;

a first low pass filter, for receiving a chrominance signal and performing a low pass filtering to generate a first filtered signal, wherein the chrominance signal represents a chrominance component of the video composite signal after a luminance/chrominance separation and a demodulation, wherein the first low pass filter comprises:

a first re-sampler, for re-sampling the chrominance signal, so as to obtain a plurality of sampling results;

a plurality of first addition units, for respectively summing up a part of the plurality of sampling results obtained from the first re-sampler;

a plurality of first multiplication units, for receiving summing results of the first addition units to generate a plurality of multiplying results; and a second addition unit, for summing up the multiplying results of the first multiplication units to generate the first filtered signal;

a second low pass filter, for receiving the chrominance signal and performing a low pass filtering to generate a second filtered signal, wherein a bandwidth of the first low pass filter is different from that of the second low pass filter; and a weighting unit, for weighting the first filtered signal and the second filtered signal according to the motion factor, so as to determine how much high frequency component of the chrominance signal is reserved.

2. The image processing device as claimed in claim 1, wherein the dynamic estimating unit comprises:

a frame difference estimating unit, for estimating the difference between a plurality of successive frames; and a look-up table unit, for determining the motion factor according to the difference estimated by the frame difference estimating unit.

3. The image processing device as claimed in claim 1, wherein the first re-sampler comprises a plurality of serially-connected first registers.

4. The image processing device as claimed in claim 1, wherein the second low pass filter comprises:

a second re-sampler, for re-sampling the chrominance signal, so as to obtain a plurality of sampling results;

a plurality of third addition units, for respectively summing up a part of the plurality of sampling results obtained from the second re-sampler;

a plurality of second multiplication units, for receiving summing results of the third addition unit to generate a plurality of multiplying results; and a fourth addition unit, for summing up the multiplying results of the second multiplication units to generate the second filtered signal.

5. The image processing device as claimed in claim 4, wherein the second re-sampler comprises a plurality of serially-connected second registers.

6. The image processing device as claimed in claim 1, wherein the weighting unit comprises:

a third multiplication unit, for generating a multiplying result according to the motion factor and the first filtered signal;

a fourth multiplication unit, for generating a multiplying result according to the motion factor and the second filtered signal; and a fifth addition unit, for summing up multiplying results of the third and fourth multiplication units, so as to predict a baseband component and a part of a high frequency component of the chrominance signal.

7. The image processing device as claimed in claim 1, wherein the first low pass filter is a narrow-band low pass filter.

8. The image processing device as claimed in claim 1, wherein the second low pass filter is a wide-band low pass filter.

9. An image processing method, used for filtering a chrominance component of a video composite signal, the chrominance component being obtained after a luminance/chrominance separation and a demodulation of the video composite signal, the method comprising:

estimating a dynamic feature of the video composite signal so as to output a motion factor, wherein the motion factor has a respective value for each pixel at the same location of a plurality of successive frames;

performing a first filtering to the chrominance component of the video composite signal;

performing a second filtering to the chrominance component of the video composite signal;

weighting the first and second filtering results according to the dynamic feature, so as to determine how much high frequency component of the chrominance component of the video composite signal is filtered, wherein at least one of the first and second filtering results is generated by re-sampling the chrominance component of the video composite signal so as to obtain a plurality of sampling results;

respectively summing up a part of the plurality of sampling results;

receiving summing results of the part of the sampling results to generate a plurality of multiplying results; and summing up the multiplying results.

10. The image processing method as claimed in claim 9, wherein the step of estimating the dynamic feature comprises:

estimating a difference between a plurality of successive frames; and determining a dynamic feature according to the difference.

11. The image processing method as claimed in claim 9, wherein the first filtering step is achieved by using a narrow-band low pass filter.

12. The image processing method as claimed in claim 9, wherein the second filtering step is achieved by using a wide-band low pass filter.

13. An image processing device, comprising:

a dynamic estimating unit, for estimating a dynamic motion degree of a video composite signal, so as to output a motion factor;

a first low pass filter, for receiving a chrominance signal and performing a low pass filtering to generate a first filtered signal, wherein the chrominance signal represents a chrominance component of the video composite signal after a luminance/chrominance separation and a demodulation;

a second low pass filter, for receiving the chrominance signal and performing a low pass filtering to generate a second filtered signal, wherein a bandwidth of the first low pass filter is different from that of the second low pass filter; and a weighting unit, for weighting the first filtered signal and the second filtered signal according to the motion factor, so as to determine how much high frequency component of the chrominance signal is reserved, wherein each of at least one of the first low pass filter and the second low pass filter comprises:

a re-sampler, for re-sampling the chrominance signal, so as to obtain a plurality of sampling results;

a plurality of first addition units, for respectively summing up a part of the plurality of sampling results obtained from the re-sampler;

a plurality of multiplication units, for receiving summing results of the first addition units to generate a plurality of multiplying results; and a second addition unit, for summing up the multiplying results of the multiplication units to generate one of the first and second filtered signals.

14. An image processing method, used for filtering a chrominance component of a video composite signal, the chrominance component being obtained after a luminance/chrominance separation and a demodulation of the video composite signal, the method comprising:

estimating a dynamic feature of the video composite signal;

performing a first filtering to the chrominance component of the video composite signal;

performing a second filtering to the chrominance component of the video composite signal;

weighting the first and second filtering results according to the dynamic feature, so as to determine how much high frequency component of the chrominance component of the video composite signal is filtered, wherein at least one of the first and second filtering results is each generated by re-sampling the chrominance component of the video composite signal so as to obtain a plurality of sampling results;

respectively summing up a part of the plurality of sampling results;

receiving summing results of the part of the sampling results to generate a plurality of multiplying results; and summing up the multiplying results to generate one of the first and second filtering results.

* * * * *